(12) United States Patent
Liang

(10) Patent No.: US 9,841,822 B2
(45) Date of Patent: Dec. 12, 2017

(54) METHOD FOR OPERATING MOBILE DEVICE USING VIBRATION SENSOR

(71) Applicant: Jie Liang, Guangzhou (CN)

(72) Inventor: Jie Liang, Guangzhou (CN)

(73) Assignee: Guangzhou UCWEB Computer Technology Co., Ltd., Guangdong (CN)

(*) Notice: Subject to any disclaimer, the term of this patent is extended or adjusted under 35 U.S.C. 154(b) by 491 days.

(21) Appl. No.: 14/143,730

(22) Filed: Dec. 30, 2013

(65) Prior Publication Data

US 2014/0113688 A1    Apr. 24, 2014

Related U.S. Application Data

(63) Continuation of application No. PCT/CN2012/077038, filed on Jun. 15, 2012, and a continuation of application No. PCT/CN2012/085512, filed on Nov. 29, 2012.

(30) Foreign Application Priority Data

Jun. 28, 2011  (CN) .......................... 2011 1 0175902
Dec. 2, 2011   (CN) .......................... 2011 1 0397634

(51) Int. Cl.
| H04B 1/38 | (2015.01) |
| G06F 3/01 | (2006.01) |
| H04M 1/725 | (2006.01) |
| G06F 3/0346 | (2013.01) |

(52) U.S. Cl.
CPC ............ *G06F 3/017* (2013.01); *G06F 3/0346* (2013.01); *H04M 1/72519* (2013.01); *H04M 2250/12* (2013.01); *H04M 2250/22* (2013.01)

(58) Field of Classification Search
CPC ......... H04M 1/72519; H04M 1/72583; H04M 1/72522; H04M 1/72547; H04M 1/0214
USPC .......................................................... 455/566
See application file for complete search history.

(56) References Cited

U.S. PATENT DOCUMENTS

| 2005/0099607 A1* | 5/2005 | Yokote ................ H04N 5/7416 353/43 |
| 2006/0063563 A1* | 3/2006 | Kaufman .............. H04M 1/663 455/556.2 |
| 2011/0009103 A1* | 1/2011 | Do ........................ G06F 3/0482 455/414.3 |

(Continued)

FOREIGN PATENT DOCUMENTS

| CN | 2924947 Y | * 7/2007 |
| CN | 101155363 A | 4/2008 |

(Continued)

OTHER PUBLICATIONS

PCT International Search Report for application PCT/CN2012/085512 dated Jun. 6, 2013.

(Continued)

*Primary Examiner* — Lana N Le

(74) *Attorney, Agent, or Firm* — Alston & Bird LLP

(57) ABSTRACT

The disclosure provides a method and device detecting a moving signal indicative of a movement of a mobile terminal by a vibration sensor embedded in the mobile terminal and executing a conditional assembly operation on a touch screen of the mobile terminal in response to detection of the moving signal.

15 Claims, 15 Drawing Sheets

| Scenario | Response function | Prompt and menu item |
|---|---|---|
| Playing a movie | Mute | Inquire whether to mute<br>● Yes<br>● No |

(56) References Cited

U.S. PATENT DOCUMENTS

| | | | | |
|---|---|---|---|---|
| 2011/0053641 | A1* | 3/2011 | Lee | G06F 1/1626 |
| | | | | 455/556.1 |
| 2011/0082369 | A1* | 4/2011 | Mohr | G06T 5/50 |
| | | | | 600/431 |
| 2012/0270605 | A1* | 10/2012 | Garrone | H04M 1/72563 |
| | | | | 455/566 |
| 2012/0322507 | A1* | 12/2012 | Ukai | H04M 1/7253 |
| | | | | 455/566 |
| 2013/0012270 | A1* | 1/2013 | Naftolin | H04M 1/72569 |
| | | | | 455/566 |
| 2014/0248852 | A1* | 9/2014 | Raleigh | H04M 15/723 |
| | | | | 455/407 |
| 2014/0258909 | A1* | 9/2014 | Kim | G06F 3/0482 |
| | | | | 715/771 |
| 2016/0321029 | A1* | 11/2016 | Zhang | G06F 3/165 |
| 2017/0212648 | A1* | 7/2017 | Choi | G06F 3/0482 |

FOREIGN PATENT DOCUMENTS

| | | | |
|---|---|---|---|
| CN | 101295221 | A | 10/2008 |
| CN | 101408798 | * | 4/2009 |
| CN | 101408798 | A | 4/2009 |
| CN | 101571785 | * | 11/2009 |
| CN | 101571785 | A | 11/2009 |
| CN | 101626427 | A | 1/2010 |
| CN | 101958968 | A | 1/2011 |
| CN | 101996043 | A | 3/2011 |
| CN | 102364422 | A | 2/2012 |
| CN | 102495706 | A | 6/2012 |

OTHER PUBLICATIONS

PCT International Search Report for application PCT/CN2012/077038 dated Jan. 3, 2013.
Office Action for CN2011/10175902 dated Jun. 19, 2012.
Office Action for CN2011/10397634 dated Dec. 5, 2012.
Written Opinion of International Searching Authority for International Patent Application PCT/CN2012/077038 dated Sep. 27, 2012, with English translation, 16 pages.
Written Opinion of International Searching Authority for International Patent Application PCT/CN2012/085512 dated Mar. 7, 2013, with English translation, 12 pages.

* cited by examiner

| No. | Scenario | Response function | Option menu |
|---|---|---|---|
| 1 | An application program is in a background | Wake up the application program and bring the application program forward | Inquire whether to bring the application program forward<br>• Yes<br>• No |
| 2 | Night mode | Day time browse mode | Inquire whether to switch to non-night display mode<br>• Yes<br>• No |
| 3 | File is being downloaded | Present downloading progress | Present the current downloading progress (XX%) |
| 4 | Cursor in input box with input content | Prompt text operation | Prompt text operation<br>• Clear the content in the input box<br>• Cancel previously input content<br>• Cancel the operation |
| 5 | Click on web page and shake | Pop up right key menu | Content of the right key menu |

FIG. 4A

| Scenario | Response function | Prompt and menu item |
|---|---|---|
| Playing a movie | Mute | Inquire whether to mute<br>• Yes<br>• No |

FIG. 4B

| Scenario | Response function | Prompt and menu item |
|---|---|---|
| Incoming call | Turn ringtone off | Turn ringtone off |

FIG. 4C

METHOD FOR OPERATING MOBILE DEVICE USING VIBRATION SENSOR

CROSS-REFERENCE TO RELATED APPLICATION

This application is a continuation of WO2013/000364, filed with WIPO on Jun. 15, 2012, claiming priority of Chinese Application No. 201110175902.5 filed with SIPO on Jun. 28, 2011, and WO2013/079005 filed on Nov. 29, 2012, claiming priority of Chinese Application No. 201110397634.1 filed with SIPO on Dec. 2, 2011, the entire contents each of which is incorporated herein by reference in their entireties.

TECHNICAL FIELD

The disclosure relates to the field of mobile communications, and more specifically, relates to a method and a device for executing an instruction in response to vibration of a mobile terminal.

BACKGROUND

Function menus of mobile terminals are generally set in a hierarchical structure, as shown in FIG. 1. When a sub-option is desired by a user, the function menu may be activated at step 1. When the function menu is activated, a parent option may be shown to the user at step 2. The parent option may comprise one or more options available for selection. Each option may be associated with a sub-option menu comprising one or more sub-options available for selection. A user may select an option, such as option 102, from the parent option at step 2. At step 3, a desired sub-option, such as sub-option 104, may be selected from the one or more sub-options.

A position of traditional function menu or home button is usually predetermined. Moreover, many options need to be pre-set. In this case, if a function menu is set in the structure as shown in FIG. 1, it is usually very time-consuming and complicated, thereby resulting in poor user experience.

To switch interface between adjacent thumbnails, direction keys are widely used. For example, when a user is browsing internet on a mobile terminal, the user may switch to a previous thumbnail by physically pressing left direction key or a thumbnail subsequent to the present thumbnail by physically pressing a right direction key. Direction keys occupy space of the touch screen.

BRIEF SUMMARY

Through applied effort, ingenuity, and innovation, solutions to improve methods, apparatus and mobile terminals have been realized and are described herein. Methods and mobile terminals are described herein that provide improved operation interface such as activating the operation interface by motion sensing. Embodiments of the disclosure describe activating a pre-set operation menu by detecting a vibration action of the mobile terminal. Embodiments of the disclosure describe a shortcut menu in addition to a tree structure menu, thus realizing fast switching or turning on/off functions, thereby making the operation convenient, saving operation time, and in turn enhancing the user experience. Methods and mobile terminals are described herein that provide an improved way to switch interface between adjacent thumbnails.

According to one exemplary embodiment of the subject disclosure, the disclosure provides a method for detecting a moving signal indicative of a movement of a mobile terminal by a vibration sensor embedded in the mobile terminal and executing a conditional assembly operation on a touch screen of the mobile terminal in response to detection of the moving signal.

According to one exemplary embodiment of the subject disclosure, a detecting unit configured to detect a moving signal indicative of a movement of a mobile terminal by a vibration sensor embedded in the mobile terminal and an activation unit configured to execute a conditional assembly operation on a touch screen of the mobile terminal in response to detection of the moving signal.

These characteristics as well as additional features, functions, and details of various embodiments are described below. Similarly, corresponding and additional embodiments are also described below.

BRIEF DESCRIPTION OF THE DRAWINGS

Figure 1:
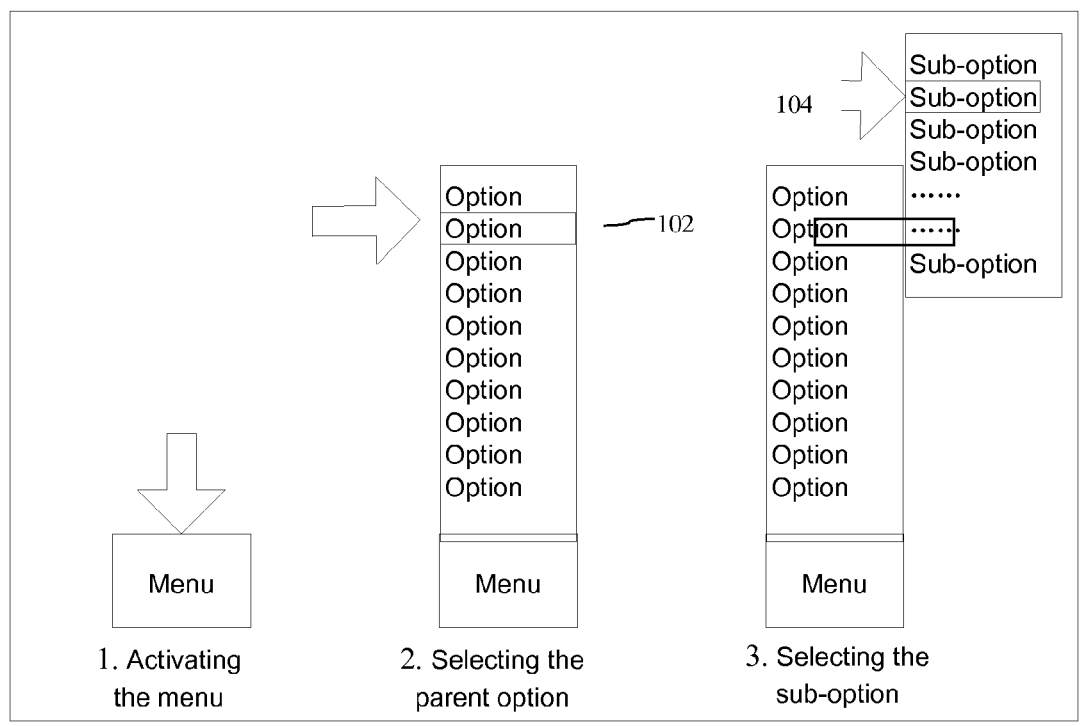
Figure 2:
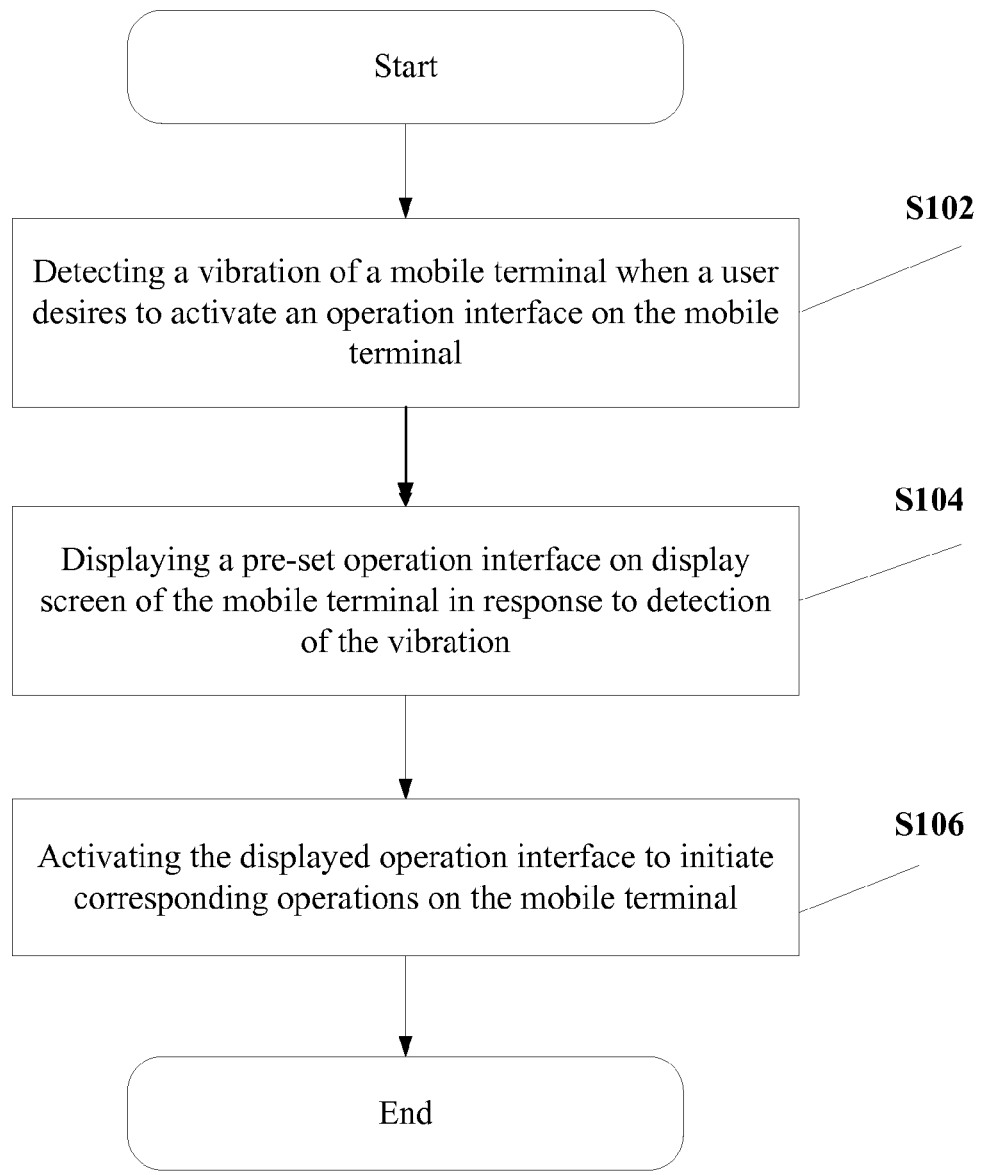
Figure 3:
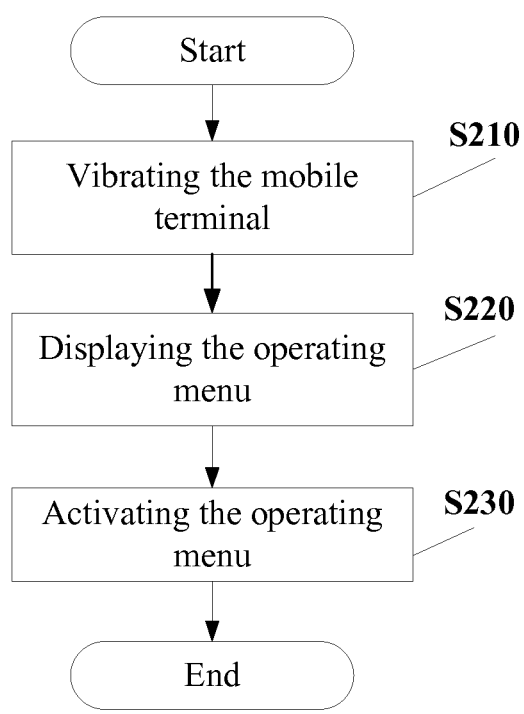
Figure 5:
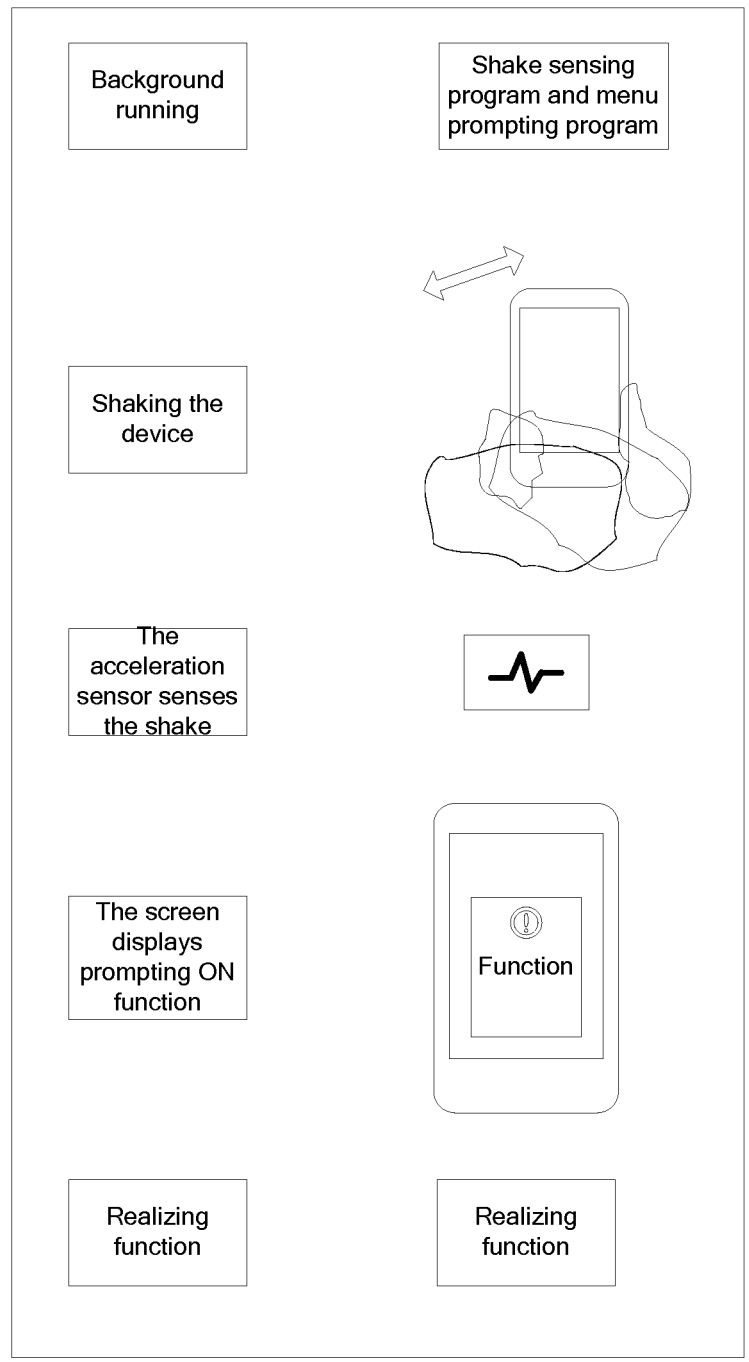
Figure 6:
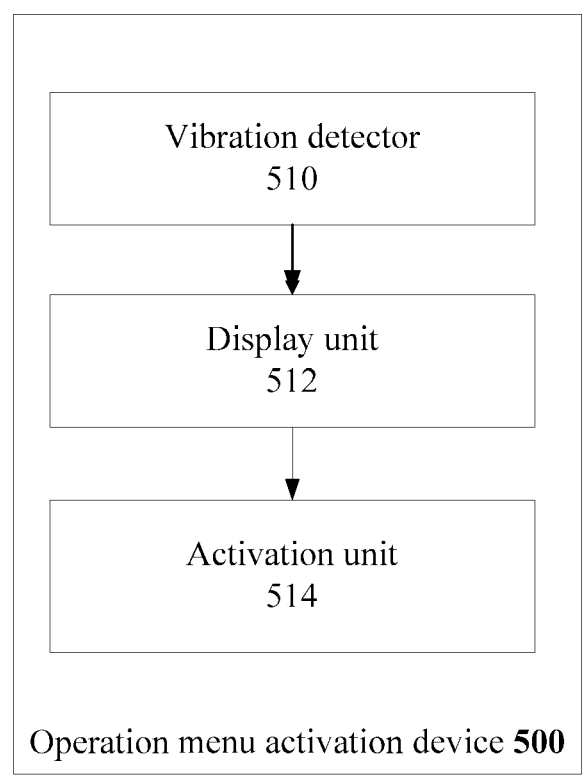
Figure 7:
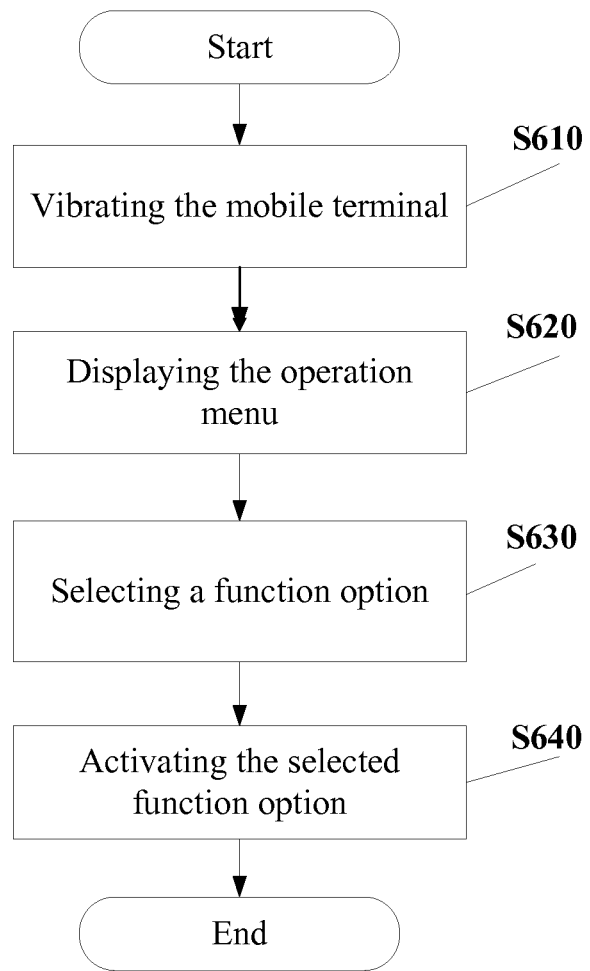
Figure 8:
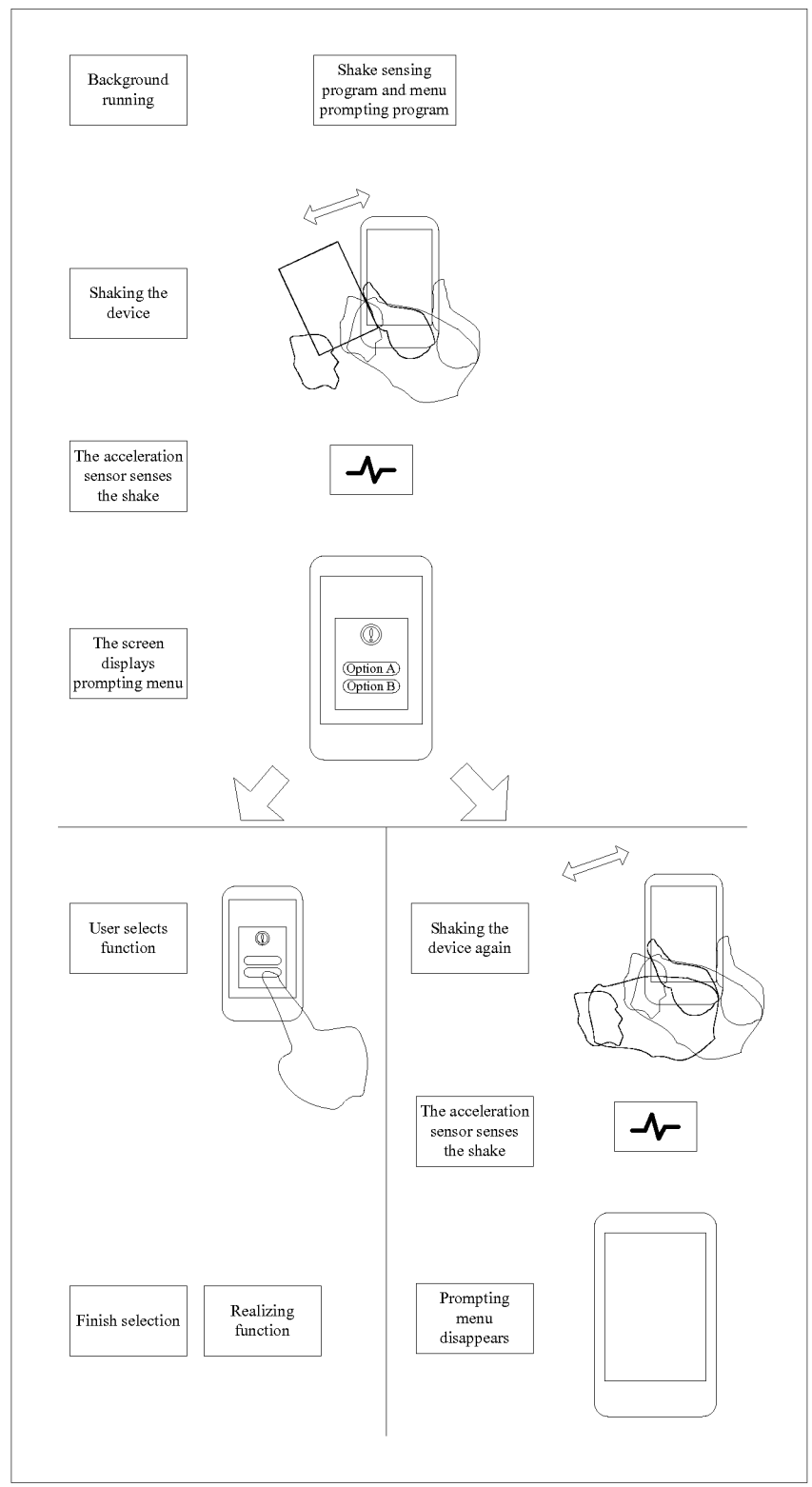
Figure 9:
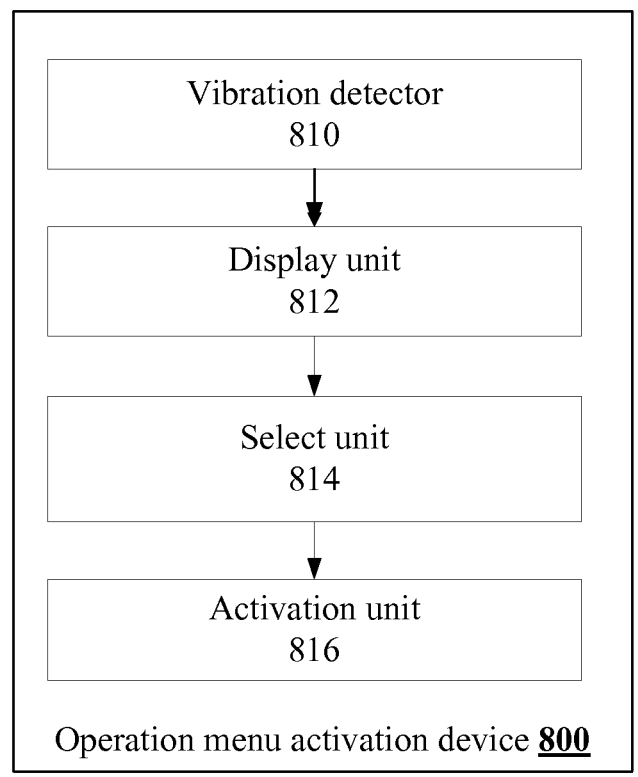
Figure 10:
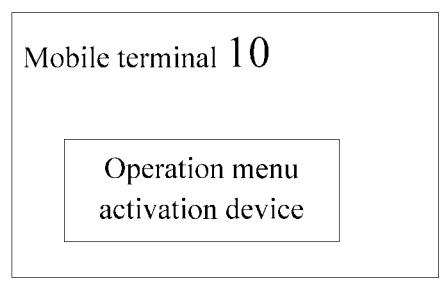

Having thus described some embodiments in general terms, reference will now be made to the accompanying drawings, which are not necessarily drawn to scale. The embodiments illustrated in the figures of the accompanying drawings herein are by way of example and not by way of limitation, and wherein:

FIG. 1 shows a diagram of a menu function of the prior art;

FIG. 2 is a flow chart illustrating a method of activating an operation interface in accordance with exemplary embodiments of the disclosure;

FIG. 3 is a flow chart illustrating a method of activating an operation menu in accordance with exemplary embodiments of the disclosure;

FIGS. 4A-4C show diagrams of response functions associated with different scenarios in accordance with exemplary embodiments of the disclosure;

FIG. 5 shows a diagram of activating an operation menu in accordance with exemplary embodiments of the disclosure;

FIG. 6 shows a block diagram of a device for activating an operation menu in accordance with exemplary embodiments of the disclosure;

FIG. 7 shows a flow chart illustrating a method of activating an operation menu in accordance with exemplary embodiments of the disclosure;

FIG. 8 shows a diagram of activating an operation menu in accordance with exemplary embodiments of the disclosure;

FIG. 9 shows a block diagram of a device for activating an operation menu in accordance with exemplary embodiments of the disclosure;

FIG. 10 shows a block diagram of a mobile terminal in accordance with exemplary embodiments of the disclosure.

Figure 11:
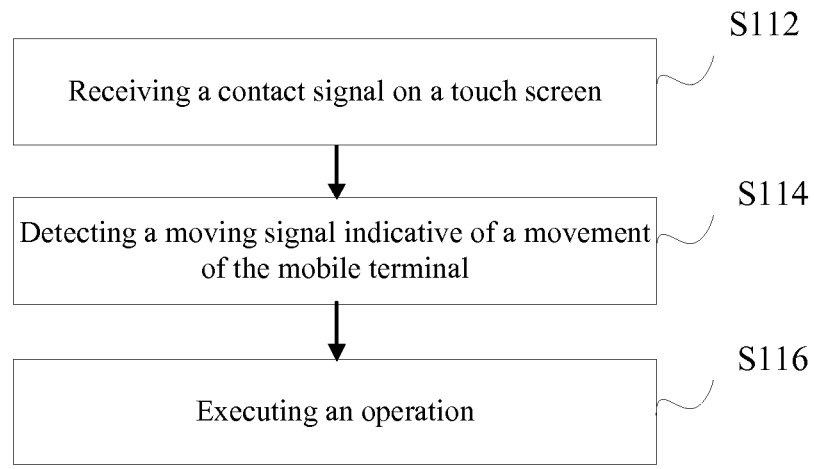
Figure 12:
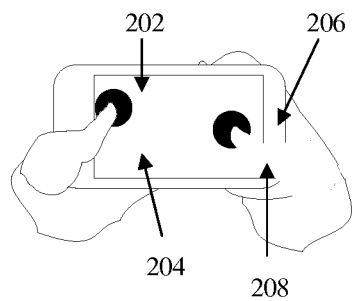
Figure 13:
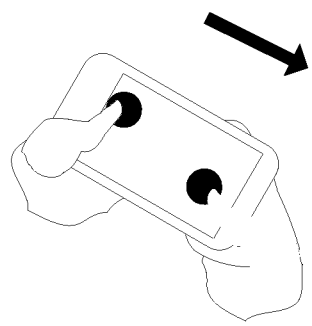
Figure 14:
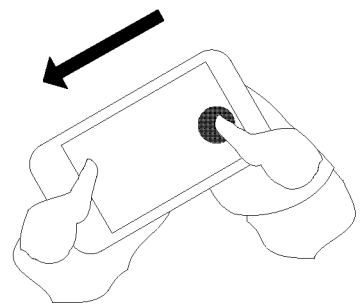
Figure 15:
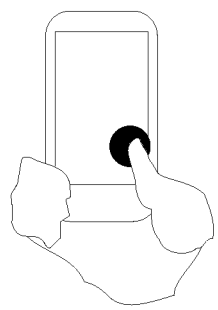
Figure 16:
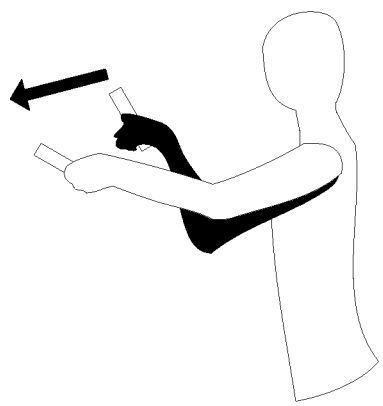
Figure 17:
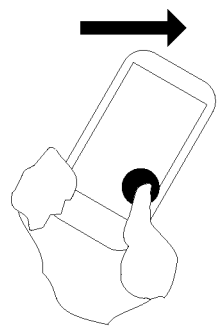
Figure 18:
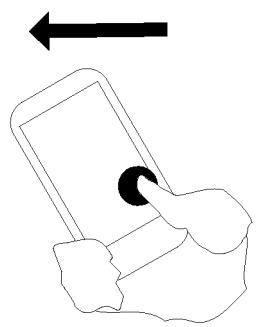
Figure 19:
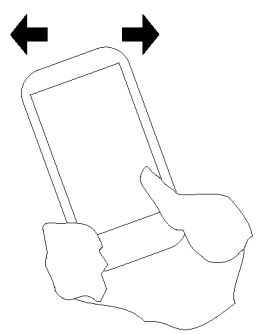
Figure 20:
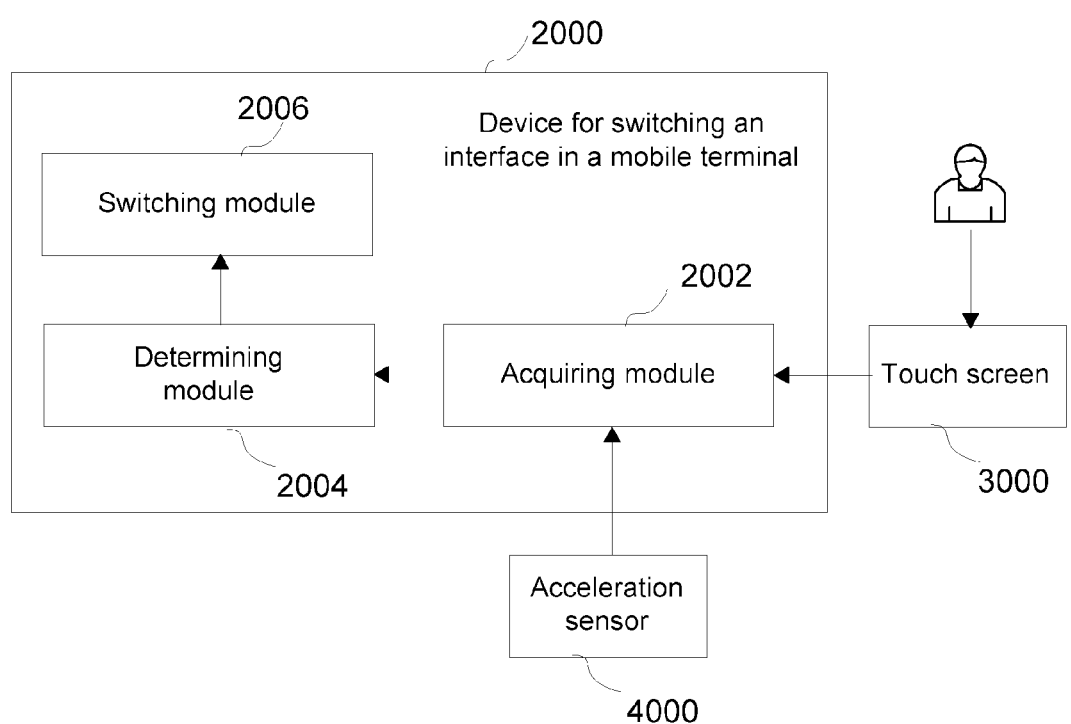
Figure 21:
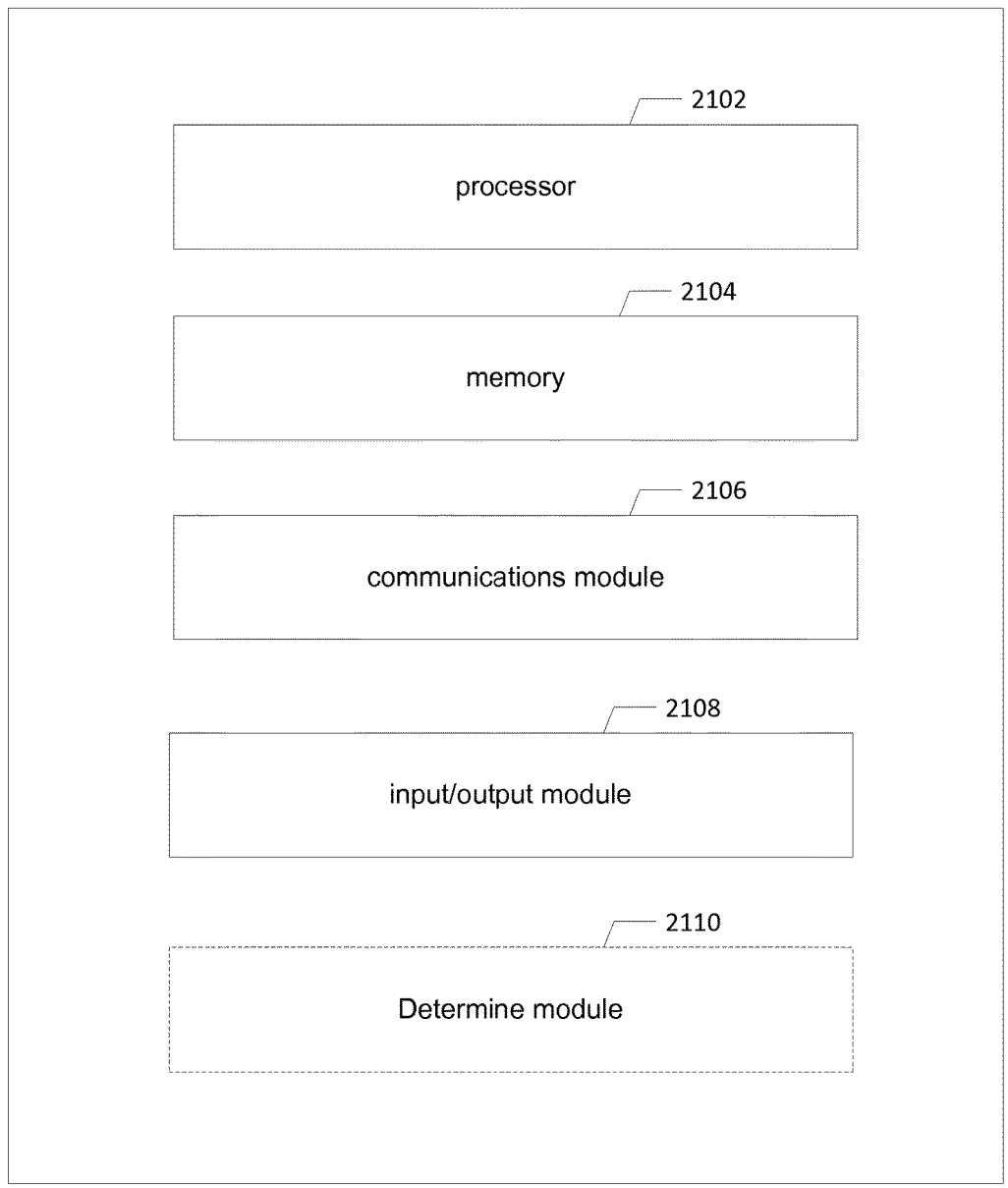

FIG. 11 is a flow chart illustrating a method of switching an interface on a touch screen in accordance with exemplary embodiments of the disclosure;

FIG. 12 is a diagram of presenting two fingers on two touch points in edge regions of a touch screen in accordance with exemplary embodiments of the disclosure;

FIG. 13 is a diagram of moving a mobile terminal in right direction with presence of a finger on a touch screen in accordance with exemplary embodiments of the disclosure;

FIG. 14 is a diagram of moving a mobile terminal in left direction with presence of fingers two touch points in edge regions on a touch screen in accordance with exemplary embodiments of the disclosure;

FIG. 15 is a diagram of presenting a finger on any touch point of a touch screen in accordance with exemplary embodiments of the disclosure;

FIG. 16 is a diagram of moving a mobile terminal downward with presence of a finger on a touch screen in accordance with exemplary embodiments of the disclosure;

FIG. 17 is a diagram of moving a mobile terminal in right direction with presence of a finger on any point of a touch screen in accordance with exemplary embodiments of the disclosure;

FIG. 18 is a diagram of moving a mobile terminal in left direction with presence of a finger on any point of a touch screen in accordance with exemplary embodiments of the disclosure;

FIG. 19 is a diagram of moving a mobile terminal in horizontal direction with presence of a finger on any point of a touch screen in accordance with exemplary embodiments of the disclosure;

FIG. 20 is a block diagram of a device for switching an interface on a touch screen in accordance with exemplary embodiments of the disclosure; and FIG. 21 illustrates a schematic diagram of example circuitry in accordance with some embodiments.

DETAILED DESCRIPTION OF THE EMBODIMENTS

The subject disclosure now will be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. In this regard, reference may be made herein to a number of mathematical or numerical expressions or values, and to a number of positions of various components, elements or the like. It should be understood, however, that these expressions, values, positions or the like may refer to absolute or approximate expressions, values or positions, such that exemplary embodiments may account for variations that may occur in the multi-channel optical cell, such as those due to engineering tolerances. Like numbers refer to like elements throughout.

As used herein, the word "exemplary" is used herein to refer to serving as an example, instance, or illustration. Any aspect, feature, function, design, etc. described herein as "exemplary" or an "example" or "examples" is not necessarily to be construed as preferred or advantageous over other aspects, features, functions, designs, etc. Rather, use of the word exemplary is intended to present concepts in a concrete fashion.

FIG. 2 is a flow chart illustrating a method of activating an operation interface in accordance with exemplary embodiments of the disclosure. When a user desires to activate an operation interface on a mobile terminal the user may shake or knock the mobile terminal. The movement of the mobile terminal may generate a moving signal. A vibration detector embedded in the mobile terminal may detect the moving signal at step S102.

In response to the detection of the moving signal, a pre-set operation interface may be displayed on a touch screen of the mobile terminal at step S104. In some embodiments, a pre-set operation interface may be displayed according to present scenario in which the present operation interface is performed. The pre-set operation interface may be implemented by an operation menu. User may select a desired operation thus activating the desired operation interface at step S106. The selection of the desired operation may be implemented by placing a point object, such as a finger, in contact with a touch point associated with the desired operation. In this manner, contact with a touch point on the touch screen may be associated with a per-defined operation, such as selection of the desired operation. The activation of the desired operation interface may initiate corresponding application to perform a corresponding operation on the mobile terminal. The operation menu may comprise one or more function options. In this manner, the initiation of a desired operation may be implemented by activating one of the one or more function options.

To save power consumption an operation interface being displayed may also be closed by vibration movement. In one embodiment, the operation interface may be closed in response to an additional moving signal resulting from an additional moving signal detected by the vibration detector. The vibration detector may comprise an acceleration sensor to detect changes in velocity resulting from the vibration.

FIG. 3 shows a flow chart illustrating a method of activating an operation menu according to exemplary embodiments of the disclosure. As shown in FIG. 3, when a user desires to activate an operation menu, user may shake or knock the mobile terminal. The movement of the mobile terminal may generate a moving signal. The moving signal of the mobile terminal may be detected by a vibration detector at step S210. In response to detection of the moving signal of the mobile terminal, a pre-set operation menu corresponding to a present working scenario may be displayed on the touch screen of the mobile terminal at step S220. The operation menu may comprise one or more options. As described above, in one embodiment, the vibration detector may comprise an acceleration sensor configured to detect changes in velocity resulting from movement, such as vibration, of the mobile terminal. In another embodiment, the vibration detector may comprise a force detector configured to detect changes in force resulting from movement, such as vibration, of the mobile terminal. The vibration detector may also be implemented in other ways well-known in the art.

The present working scenario of the mobile terminal may comprise a scenario related to a browser, video and audio, and/or CallMaster. The scenario related to a browser may comprise, for example, running an application program in a background, night mode, downloading a file, cursor in input box with input content, clicking on the web page and shaking. The scenario related to video and audio may comprise, for example, playing a movie. The scenario related to CallMaster may comprise, for example, receiving an incoming call. At Step S230, the operation menu being displayed may be activated to initiate a corresponding application to perform a corresponding operation on the mobile terminal.

FIGS. 4A-4C show diagrams of pre-set definitions associated with different scenarios according to exemplary embodiments of the disclosure. In examples illustrated in FIGS. 4A-4C, the movement of the mobile terminal may be a vibration of the mobile terminal FIG. 4A illustrates mobile terminal in scenarios related to a browser. In a first scenario, an application program is running in a background. When a user vibrates the mobile terminal, in response to detection of the vibration, a response function of "wake up the application program and bring the application program forward"

may be presented. Option menu including options of "Yes" and "No" may be displayed on the touch screen. "Yes" may indicate a desire to execute the function option, namely, to wake up the application program and bring the application program forward. "No" may indicate otherwise.

In a second scenario, the mobile terminal may be in a night mode. In response to detection of the vibration, a response function of "day time browse mode" may be presented. Option menu including options of "Yes" and "No" may be displayed on the touch screen. "Yes" may indicate a desire to switch to a day time display mode. "No" indicates to keep the application program in night-mode.

In a third scenario, the file is being downloaded. In response to detection of the vibration, a response function is to present downloading progress. Current downloading progress represented by (XX %) may be shown on the touch screen.

In a fourth scenario, a cursor is in an input box with input content. In response to detection of the vibration, a response function is to activate text operations. The text operation options may include (1) "clear content in the input box;" (2) "cancel previously input content" and (3) "cancel the operation."

In a fifth scenario, a user clicks on a web page and shakes the mobile terminal. In response to detection of the vibration, a response function is to present a right key menu. Contents of the right key menu may be displayed on the touch screen. User may select an option from the right key menu.

FIG. 4B illustrates scenarios related to audio and video. If a user is playing a movie a response function of "mute" is presented in response to a vibration of the mobile terminal. Option menu including "Yes" and "No" may be displayed on the touch screen. Option "Yes" may indicate to mute the movie. "No" may indicate to keep the sound of the movie.

FIG. 4C illustrates scenarios related to CallMaster. If an incoming call is received, a response function of "turn ringtone off" may be presented on the touch screen of the mobile terminal in response to detection of the vibration. Examples may not be limited to FIGS. 4A-4C.

FIG. 5 shows a diagram of activating an operation menu in accordance with exemplary embodiments of the disclosure. FIG. 6 shows a block diagram of a device for activating an operation menu in accordance with exemplary embodiments of the disclosure. With reference to FIGS. 5 and 6, a shake sensing program and a menu prompting program may be running in a background on the mobile terminal. In this embodiment, the operation menu may have no options available for selection. When a user shakes the mobile terminal, a vibration detector, such as a vibration detector 510 shown in FIG. 6, embedded in the mobile terminal may detect vibration caused by shaking. As described above, the vibration detector 510 may comprise an acceleration sensor configured to detect changes in velocity resulting from vibration of the mobile terminal. The vibration detector may also comprise a force detector configured to detect changes in force resulting from the vibration. The vibration detector may be implemented in other ways well-known in the art. In response to detection of the vibration, a pre-set operation menu corresponding to present working scenario may be displayed on touch screen by a display unit such as display unit 512 shown in FIG. 6. The display unit 512 may comprise a display module configured to display a pre-set operation menu on the touch screen in response to detection of vibration of the mobile terminal. The display module may comprise a sub-display module configured to display a pre-set operation menu corresponding to a present working scenario on the touch screen in response to detection of vibration of the mobile terminal. A desired operation menu may be activated by an activation unit 514 as shown in FIG. 6 to initiate an application to perform the desired operation on the mobile terminal. The activation unit 514 may comprise an activation module configured to activate the displayed operation menu.

FIG. 7 shows a flow chart illustrating a method of activating an operation interface according to exemplary embodiments of the disclosure. As shown in FIG. 7, similar to method described in FIG. 3, at step S610, a user may vibrate a mobile terminal to generate a moving signal when user desires to activate an operation menu. At step S620, in response to detection of the moving signal by a vibration detector, a pre-set operation menu corresponding to the present working scenario may be displayed on the touch screen of the mobile terminal. In this embodiment, the operation menu may have one or more options available for selection. At step S630, a desired function option may be selected from the available options by placing a point object such as a finger in contact with the desired function option. At step S640, the selected operating function may be activated to initiate a corresponding application to perform a corresponding operation on the mobile terminal.

FIG. 8 shows a diagram of activating an operation menu according to exemplary embodiments of the disclosure. In this embodiment, an operation menu may have one or more options. As shown in FIG. 8, a shake sensing program and a menu prompting program may be running in a background on the mobile terminal. When a user is shaking the mobile terminal, an vibration detector embedded in the mobile terminal may sense changes in force or velocity resulting from the vibration of the mobile terminal. In response to the vibration of the mobile terminal, a pre-set operation menu corresponding to present working scenario may be displayed on the touch screen. As shown in lower left region of FIG. 8, a desired function option may be selected. The selected function option may be activated to initiate the desired operating function. In another embodiment, as shown in lower right region of FIG. 8, user may shake the mobile terminal again to close the displayed operation menu. In other words, the displayed operation menu may be closed in response to a detection of an additional moving signal resulting from an additional vibration movement.

FIG. 9 shows a block diagram of an operation menu activation device 800 for activating an operation menu according to exemplary embodiments of the disclosure. As shown in FIG. 9, the operation menu activation device 800 may comprise a vibration detector 810, a display unit 812, a select unit 814 and an activation unit 816. The vibration detector 810, similar to the vibration detector 510, may detect a moving signal of the mobile terminal by detecting changes in velocity or force.

In response to detection of the moving signal, the display unit 812 may present and display on the touch screen a pre-set operation menu corresponding to a present working scenario. In this embodiment, the operation menu may have one or more function options available for selection. Each function option may be associated with one or more operation functions. The selecting unit 814 may select a desired operation function from the function option(s) in the operation menu. After the selecting unit 814 selects the desired operation option, the activating unit 816 may activate the selected operation function to initiate a corresponding application to perform a corresponding operation on the mobile terminal. In another embodiment, the operation menu activation device 800 may also comprise a closing unit (not shown) configured to close the operation menu displayed on the mobile terminal in response to an additional moving signal resulting from an additional vibration movement.

FIG. 10 shows a block diagram of a mobile terminal 10 according to exemplary embodiments of the disclosure. As shown in FIG. 10, the mobile terminal 10 may comprise an operation menu activation device, such as the operation menu activation device 500 or the operation menu activation device 800 as described above. Furthermore, the mobile terminal 10 may also comprise various variants of the above operation menu activation device falling within the scope of the present invention.

In addition to indicating a vibration of the mobile terminal, the moving signal may also indicate a movement in three Cartesian axes. Contact with a touch point on the touch screen may be associated with a per-defined operation such as switching between adjacent interfaces when it is combined with a moving signal.

For example, when a user contacts the touch screen, one or more contact signals may be received by the mobile terminal. The contact signal may be induced by presenting one finger on a touch point on the touch screen or two fingers on two touch points of different regions on the touch screen. Each touch point may be associated with one pre-defined instruction. A pre-defined instruction may thus be acquired at step S112 by presenting one or more fingers on the touch screen.

At step S114, a vibration sensor embedded in the mobile terminal may detect a moving signal indicative of a movement of the mobile terminal, such as orientation of the mobile terminal. The orientation may be directions in three Cartesian axes. At step S116, a processor of the mobile terminal may determine if the pre-defined instruction and the moving signal are associated with a pre-defined conditional orientation operation, such as an interface switching operation. If it is determined yes, the pre-defined operation and the moving signal meet conditions of a pre-defined conditional assembly operation. The pre-defined conditional orientation operation may be executed at step S116. Pre-defined operation and orientation may be combined in different ways to provide different schemes available for users' selection. For example, horizontal direction in combination with a switching operation may indicate switching to a previous interface. Vertical direction in combination with a switching operation may indicate switching to a subsequent interface. For another example, left direction in combination with a switching-instruction may indicate switching to a previous interface. Right direction in combination with a switching-instruction may indicate switching to a subsequent interface. User may pre-define the conditional assembly operations using different combinations. Once the condition is met, the interface may be switched by executing the pre-defined conditional assembly operation.

FIG. 12 is a diagram of presenting two fingers on two touch points in two edge regions on the touch screen according to exemplary embodiments of the disclosure. As shown in FIG. 12, user may present a first finger on touch point 202 in edge region 204 to induce a first contact signal and a second finger on touch point 206 in edge region 208 on the touch screen 200 to induce a second contact signal. The first contact signal and the second contact signal may be associated with a pre-defined operation. In presence of the two fingers on the touch screen, user may move the mobile terminal in horizontal direction such as in a right direction as shown in FIG. 13. If the pre-defined operation, such as presenting two fingers on two touch points on the touch screen in combination with a moving signal such as moving in right direction meet conditions of a pre-defined conditional assembly operation, such as closing present interface and switching to an interface subsequent to the present interface, the pre-defined conditional assembly operation of closing present interface and switching to a subsequent interface may be executed. The interface may be a web page, an e-book, a game and/or an interface of any other applications.

In another embodiment, user may move the mobile terminal in a left direction as shown in FIG. 14. If presenting two fingers on two touch points on the touch screen in combination with moving the mobile terminal in a left direction are associated with switching the present interface to an interface previous to the present interface, a pre-defined conditional assembly operation of closing the present interface and switching to the previous interface may be executed.

In FIGS. 13 and 14, the mobile terminal is moved in a horizontal direction. The mobile terminal moving in a vertical direction may cause execution of similar pre-defined conditional assembly operations. For example, a pre-defined conditional assembly operation of closing the present interface and switching to a previous interface may be associated with presenting two fingers on two touch points in combination with moving the mobile terminal in a downward direction. A pre-defined conditional assembly operation of closing the present interface and switching to a subsequent interface may be associated with presenting two fingers on two touch points in combination with moving the mobile terminal in an upward direction.

In addition to switching between adjacent interfaces as described in FIG. 13 and FIG. 14, the pre-defined conditional assembly operation may close the present interface and bring forward another interface in the background. For example, presenting two fingers on two touch points in combination with moving the mobile terminal back and forth in one direction, such as in horizontal direction, may meet cause an execution of closing the present interface and bringing forward an interface in the background for use.

In FIGS. 12-14, the finger may be presented on two touch points in edge regions of the touch screen. In other embodiments, the finger may be presented on any touch point on the touch screen, not limited to edge regions. As shown in FIG. 15, a finger may be presented on any point of the touch screen. Presence of one finger on any touch point of the touch screen in combination with movement of the mobile terminal in vertical direction may cause an execution of closing the present interface and switching to an adjacent interface. For example, moving the mobile terminal in downward direction in presence of a finger on any touch point on the touch screen, as shown in FIG. 16, may cause an execution of closing the present interface and switching to a previous interface. Moving the mobile terminal in upward direction in presence of a finger on any touch point on the touch screen may cause an execution of closing the present interface and switching to a subsequent interface.

In another embodiment, presence of one finger on any touch point of the touch screen in combination with moving the mobile terminal in horizontal direction may cause an execution of closing the present interface and switching to an adjacent interface, previous or subsequent interface, depending on pre-defined conditions of conditional assembly operations. For example, as shown in FIG. 17, the mobile terminal may be moved in right direction. In presence of a finger on a touch point on the touch screen, moving the mobile terminal in right direction may cause an execution of closing the present interface and switching to a subsequent interface. Moving the mobile terminal in a left direction, as shown in FIG. 18, may cause an execution of closing the present interface and switching to a previous interface.

In addition to switching between adjacent interfaces as described in FIGS. 16-18, the pre-defined conditional assembly operation may close the present interface and bring forward another interface in the background. For example, presenting one finger on any touch point in combination with moving the mobile terminal back and forth in one direction, such as in horizontal direction, may cause an execution of closing the present interface and bringing forward an interface in the background for use.

For example, the present interface may be a web page. The previous interface may be an e-book. The subsequent interface may be an album. Execution of closing the present interface and switching to the previous interface, such as embodiments described in FIGS. 14, 16 and 18, may switch interface from the web page to e-book. Execution of closing the present interface and switching to the subsequent interface, such as embodiments described in FIGS. 13 and 17, may switch interface from the web page to album.

For another example, the present interface may be a web page. An interface in the background may be a video application. Execution of closing the present interface and bringing forward the interface in the background, such as embodiments described in FIG. 19, the webpage may be closed. The video application may be brought forward.

FIG. 20 is a block diagram of a device 2000 for switching an interface on a touch screen 3000 according to exemplary embodiments of the disclosure. The device 2000 may comprise an acquiring module 2002 configured to receive a contact signal induced by a contact on the touch screen 3000. The contact signal may be associated with a pre-defined operation. The acquiring module 2002 may also be configured to acquire from a vibration detector such as an acceleration sensor 4000 a moving signal indicative of a movement, such as moving direction, of the mobile terminal. Both the induction of the contact signal and the movement of the mobile terminal are incurred by a user. The acquiring module 2002 may comprise sub-modules configured to acquire signals triggered by a user. For example, the contact signal may be received by a sub-acquiring module such as a pre-defined operation acquiring module. The movement of the mobile terminal may be acquired by a movement acquiring module. The device 2000 may also comprise a determining module 2004 configured to determine whether the pre-defined operation in combination with movement of the mobile terminal meet conditions of pre-defined conditional assembly operations. If the conditions of a pre-defined conditional assembly operation are met, a switching module 2006 configured to execute the pre-defined conditional assembly operation, such as closing the present interface and switching the present interface to an adjacent interface or bringing an interface in the background forward.

The mobile terminal described above may be handheld terminal devices, such as mobile phones, Personal Digital Assistants (PDA) and the like. Therefore, the scope of protection of the present invention should not be limited to a particular type of mobile terminal.

FIG. 21 shows a schematic block diagram of example circuitry 2100, some or all of which may be included in operation menu activation device 500, operation menu activation device 800 and device 2000. In accordance with some example embodiments, circuitry 2100 may include various elements, such as one or more processors 2102, memories 2104, communications modules 2106, and/or input/output modules 2108.

In some embodiments, such as when circuitry 2100 is included in activation unit 514 and activation unit 816, acquiring module 2002, determining module 2004 and switching module 2006 may also or instead be included with processor. As referred to herein, "unit" and "module" includes hardware, software, and/or firmware configured to perform one or more particular functions. In this regard, the means of circuitry as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 2104) that is executable by a suitably configured processing device (e.g., processor 2102), or some combination thereof.

Processor 2102 may, for example, be embodied as various means for processing including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Processor 2102 may comprise a plurality of means for processing. The plurality of means for processing may be embodied on a single computing device or may be distributed across a plurality of computing devices collectively configured to function as circuitry 2100. The plurality of means for processing may be in operative communication with each other and may be collectively configured to perform one or more functionalities of circuitry 2100 as described herein. In an example embodiment, processor 2102 may be configured to execute instructions stored in memory 304 or otherwise accessible to processor 2102. These instructions, when executed by processor 2102, may cause circuitry 2100 to perform one or more of the functions described herein.

Whether configured by hardware, firmware/software methods, or by a combination thereof, processor 2102 may comprise an entity capable of performing operations according to embodiments of the present disclosure while configured accordingly. Thus, for example, when processor 302 is embodied as an ASIC, FPGA, or the like, processor 2102 may comprise specifically configured hardware for conducting one or more operations described herein. As another example, when processor 2102 may be embodied as an executor of instructions, such as may be stored in memory 304, the instructions may specifically configure processor 2102 to perform one or more algorithms, methods, operations, or functions described herein. For example, processor 2102 may be configured to determine if a pre-defined operation associated with a contact signal induced by a presence of a finger on the touch screen in combination with a movement of the mobile terminal meets conditions of a pre-defined conditional assembly operation.

Memory 2104 may comprise, for example, volatile memory, non-volatile memory, or some combination thereof. Although illustrated in FIG. 21 as a single memory, memory 2104 may comprise a plurality of memory components. The plurality of memory components may be embodied on a single computing component or distributed across a plurality of computing components. In various embodiments, memory 304 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 2104 may be configured to store information, data, applications, instructions, or the like for enabling circuitry 2100 to carry out various functions in accordance with example embodiments discussed herein. For example, in at least some embodiments, memory 304 may be configured to buffer input data for processing by processor 2102. Additionally or alternatively, in at least some embodiments, memory 2104 may be configured to store program instructions for execution by processor 2102 and/or data for processing by processor 2102. Memory 2104 may store information in the form of static and/or dynamic information. This stored information may be stored and/or used by circuitry 2100 during the course of performing its functionalities.

Communications module 2106 may be embodied as any component or means for communication embodied in circuitry, hardware, a computer program product comprising computer readable program instructions stored on a computer readable medium (e.g., memory 2104) and executed by a processing device (e.g., processor 2102), or a combination thereof that is configured to receive and/or transmit data from/to another device, such as, for example, a second circuitry 2100 and/or the like. In some embodiments, communications module 2106 (like other components discussed herein) can be at least partially embodied as or otherwise controlled by processor 2102. In this regard, communications module 2106 may be in communication with processor 2102, such as via a bus. Communications module 2106 may include, for example, an antenna, a transmitter, a receiver, a transceiver, network interface card and/or supporting hardware, and/or firmware/software for enabling communications. Communications module 2106 may be configured to receive and/or transmit any data that may be stored by memory 2104 using any protocol that may be used for communications. Communications module 2106 may additionally and/or alternatively be in communication with the memory 2104, input/output module 2108, and/or any other component of circuitry 2100, such as via a bus. Communications module 2106 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol.

Input/output module 2108 may be in communication with processor 2102 to receive an indication of an input and/or to provide an audible, visual, mechanical, or other output. In that sense, input/output module 2108 may include means for implementing analog-to-digital and/or digital-to-analog data conversions. Input/output module 2108 may include support, for example, for a display, touch screen, keyboard, button, click wheel, mouse, joystick, an image capturing device, microphone, speaker, biometric scanner, and/or other input/output mechanisms. In embodiments where circuitry 2100 may be implemented as a server or database, aspects of input/output module 2108 may be reduced as compared to embodiments where circuitry 2100 may be implemented as an end-user machine or other type of device designed for complex user interactions. In some embodiments (like other components discussed herein), input/output module 2108 may even be eliminated from circuitry 2100. Alternatively, such as in embodiments wherein circuitry 2100 is embodied as a server or database, at least some aspects of input/output module 2108 may be embodied on an apparatus used by a user that is in communication with circuitry 2100. Input/output module 308 may be in communication with memory 304, communications module 2106, and/or any other component(s), such as via a bus. Although more than one input/output module and/or other component can be included in circuitry 2100, only one is shown in FIG. 21 to avoid overcomplicating the disclosure (e.g., like the other components discussed herein).

In some embodiments, determining module 2110 may also or instead be included and configured to perform the functionality discussed herein related to determining predefined conditional assembly operation. In some embodiments, some or all of the functionality of determining module 2110 may be performed by processor 2102. In this regard, the example processes discussed herein can be performed by at least one processor 2102 and/or determining module 2110. For example, non-transitory computer readable storage media can be configured to store firmware, one or more application programs, and/or other software, which include instructions and other computer-readable program code portions that can be executed to control processors of the components of circuitry 300 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor, and/or other programmable apparatus's circuitry to produce a machine, such that the computer, processor, or other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various forms, including entirely of hardware or any combination of software and hardware. Furthermore, embodiments may take the form of a computer program product on at least one non-transitory computer readable storage medium having computer readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to components, such as functional modules, system components, and circuitry. Below is a discussion of an example process flow chart describing functionality that may be implemented by one or more components and/or means discussed above and/or other suitably configured circuitry.

According to one aspect of the subject disclosure, a vision machine apparatus 106 of exemplary embodiments of the subject disclosure generally operates under control of a computer program. The computer program for performing the methods of exemplary embodiments of the disclosure may include one or more computer-readable program code portions, such as a series of computer instructions, embodied or otherwise stored in a computer-readable storage medium, such as the non-volatile storage medium.

FIGS. 1, 2, 7 and 11 are flow charts reflecting processes and control of methods, systems, and computer programs according to exemplary embodiments of the disclosure. It will be understood that each block or step of the flow chart, and combinations of blocks or steps in the flow chart, may be implemented by various means, such as hardware alone or in combination with firmware, and/or software including one or more computer program instructions. As will be appreciated, any such computer program instructions may be loaded onto a computer, special purpose computer, or other programmable data processing apparatus, such as processor 2102, to produce a machine, or machines, such that the computer program product includes the instructions which execute on the computer or other programmable data processing apparatus (e.g., hardware) to create means for implementing the functions described herein, such as the functions specified in the block(s) or step(s) of the flow charts of FIGS. 1, 2, 7 and 11.

These computer program instructions may also be stored in a computer-readable storage device (e.g., memory 2104) that may direct a computer or other programmable data processing apparatus to function in a particular manner, such that the instructions stored in the computer-readable storage device produce an article of manufacture including instruction computer-readable instructions for implementing the functions described herein, such as the functions specified in the block(s) or step(s) of the flow charts of FIGS. 1, 2, 7 and 11. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions described herein, such as the functions specified in the block(s) or step(s) of the flow chart of FIGS. 1, 2, 7 and 11.

Accordingly, blocks or steps of the flow chart support means and combinations of means for performing and/or implementing the specified functions, combinations of steps for performing and/or implementing the specified functions and program instruction means for performing and/or implementing the specified functions. It will also be understood that one or more blocks or steps of the flow chart, and combinations of blocks or steps in the flow chart, may be implemented by special purpose hardware-based computer systems which perform the specified functions or steps, or combinations of special purpose hardware and computer instructions.

It will be appreciated by those skilled in the art that changes could be made to the examples described above without departing from the broad inventive concept. It is understood, therefore, that this disclosure is not limited to the particular examples disclosed, but it is intended to cover modifications within the spirit and scope of the disclosure as defined by the appended claims. Although specific terms are employed herein, they are used in a generic and descriptive sense only and not for purposes of limitation.

Although various embodiments of the present invention have been described with reference to the figures, those skilled in the art should understand that various improvements may also be occur to various embodiments mentioned by the present invention without departing from the summary of the present invention. Therefore, the scope of protection of the present invention should be determined by the contents of the appended claims.

Obviously, those skilled in the art should understand that each module or each step of the present invention may be implemented by a general purpose computing device, they may be focused on a single computing device, or may be distributed on the network composed of multiple computing devices. Optionally, they may be implemented by a computing device executable program code, so that they are stored in a storage device for execution by the computing device, or may be implemented by making them into various integrated circuit module respectively, or making multiple modules or steps among them into a single integrated circuit module. In this way, the present invention will not limit the combination of any specific hardware and software.

The above is only the preferred embodiment of the present invention, and not limited to the present invention. For those skilled in the art, the present invention may have various alterations and changes. Any modification, equivalent replacement, improvement and so on within the spirit and principle of the present invention should be contained within the scope of protection of the present invention.

What is claimed is:

1. A method, comprising:
   detecting a first moving signal indicative of a first movement of a mobile terminal by a vibration sensor embedded in the mobile terminal;
   in response to detection of the first moving signal, executing a conditional assembly operation on a touch screen of the mobile terminal comprising switching between adjacent operation interfaces of at least two interfaces according to a predefined order of the interfaces;
   detecting a second moving signal indicative of a second movement of the mobile terminal by the vibration sensor;
   determining a present working scenario of the mobile terminal, wherein the present working scenario indicates at least one of running a web browser, playing video and audio, or receiving an incoming call; and
   in response to detection of the second moving signal, displaying a response function associated with a pre-set operation menu on the touch screen of the mobile terminal, wherein the pre-set operation menu is based on the present working scenario, and the response function indicates an action to be performed in association with the pre-set operation menu.

2. The method of claim 1, further comprising activating the operation interface to initiate an application to perform a corresponding operation on the mobile terminal.

3. The method of claim 1, further comprising:
   receiving, via the touch screen, a touch selection of an operating function from one or more function options in the pre-set operation menu; and
   activating the selected operating function to initiate the corresponding application to perform the corresponding operation on the mobile terminal.

4. The method of claim 1, further comprising:
   detecting, via the vibration sensor, a third moving signal indicative of a third movement of the mobile terminal; and
   turning off the pre-set operation menu displayed on the mobile terminal in response to detection of the third moving signal.

5. The method of claim 1, further comprising:
receiving a contact signal on the touch screen, the contact signal being associated with a pre-defined operation; and
executing a second conditional assembly operation on the touch screen according to the pre-defined operation being received concurrently with the moving signal.

6. The method of claim 1, further comprising closing the pre-set operation menu.

7. The method of claim 1, wherein the first moving signal and the second moving signal are indicated by changes in velocity.

8. The method of claim 1, wherein the first moving signal and the second moving signal indicate orientation.

9. The method of claim 8, wherein the orientation includes directions in three Cartesian axes.

10. The method of claim 1 wherein executing the conditional assembly operation further comprises bringing forward operation interface in the background.

11. A mobile terminal, comprising:
a vibration detector configured to:
   detect a first moving signal indicative of a first movement of the mobile terminal by a vibration sensor embedded in the mobile terminal; and
   detect a second moving signal indicative of a second movement of the mobile terminal by the vibration sensor;
an activation unit configured to:
   in response to detection of the first moving signal, execute a conditional assembly operation on a touch screen of the mobile terminal, wherein the activation unit configured to execute the conditional assembly operation includes the activation unit being configured to switch between adjacent operation interfaces of the plurality of interfaces according to the pre-defined order; and
a display unit configured to:
   determine a present working scenario of the mobile terminal, wherein the present working scenario indicates at least one of running a web browser, playing video and audio, or receiving an incoming call; and
   in response to detection of the second moving signal, display a response function associated with a pre-set operation menu on the touch screen of the mobile terminal, wherein the pre-set operation menu is based on the present working scenario, and the response function indicates an action to be performed in association with the pre-set operation menu.

12. The mobile terminal of claim 11, further comprising:
a selecting unit configured to receive a touch selection of an operating function from one or more function options in the displayed pre-set operation menu,
wherein the activation unit is configured to activate the selected operating function to initiate the corresponding application to perform the corresponding operation on the mobile terminal.

13. The mobile terminal of claim 11, wherein the vibration detector is further configured to detect a third moving signal indicative of a third movement of the mobile terminal, and the mobile terminal further comprising a closing unit configured to close the displayed operation menu on the mobile terminal in response to detection of the third moving signal.

14. The mobile terminal of claim 11, wherein the vibration detector comprises an acceleration sensor configured to detect the first moving signal and the second moving signal of the mobile terminal in response to changes in velocity resulting from the vibration of the mobile terminal.

15. A method, comprising:
detecting a first moving signal indicative of a first movement of a mobile terminal by a vibration sensor embedded in the mobile terminal, the movement resulting from changes in one of velocity and orientation;
in response to detection of the first moving signal, executing a conditional assembly operation on a touch screen of the mobile terminal comprising switching between adjacent operation interfaces of at least two interfaces according to a predefined order of the interfaces;
detecting a second moving signal indicative of a second movement of the mobile terminal by the vibration sensor;
determining a present working scenario of the mobile terminal, wherein the present working scenario indicates at least one of running a web browser, playing video and audio, or receiving an incoming call; and
in response to detection of the second moving signal, displaying a response function associated with a pre-set operation menu on the touch screen of the mobile terminal, wherein the pre-set operation menu is based on the present working scenario, and the response function indicates an action to be performed in association with the pre-set operation menu.

* * * * *

UNITED STATES PATENT AND TRADEMARK OFFICE
CERTIFICATE OF CORRECTION

PATENT NO. : 9,841,822 B2
APPLICATION NO. : 14/143730
DATED : December 12, 2017
INVENTOR(S) : Liang It is certified that error appears in the above-identified patent and that said Letters Patent is hereby corrected as shown below:

In the Claims

Column 16,
Line 7, delete "in the displayed pre-set operation menu" and insert --in the pre-set operation menu--.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*